(12) United States Patent
Xie et al.

(10) Patent No.: US 10,965,700 B2
(45) Date of Patent: Mar. 30, 2021

(54) FRAUD DETECTION BASED ON ANALYSIS OF FREQUENCY-DOMAIN DATA

(71) Applicant: PAYPAL, INC., San Jose, CA (US)

(72) Inventors: Zhen Xie, Santa Clara, CA (US); Kasra Vakilinia, San Jose, CA (US); Yang Chen, San Jose, CA (US); Hagar Oppenheim, Sunnyvale, CA (US); Xing Ji, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 297 days.

(21) Appl. No.: 16/025,451

(22) Filed: Jul. 2, 2018

(65) Prior Publication Data
US 2020/0007564 A1   Jan. 2, 2020

(51) Int. Cl.
*H04L 29/06* (2006.01)
*G06Q 20/40* (2012.01)
*G06F 16/25* (2019.01)
*G06F 16/22* (2019.01)

(52) U.S. Cl.
CPC ...... *H04L 63/1425* (2013.01); *G06F 16/2228* (2019.01); *G06F 16/258* (2019.01); *G06Q 20/4016* (2013.01)

(58) Field of Classification Search
CPC ............. H04L 63/1425; G06F 16/2228; G06F 16/258; G06Q 20/4016
See application file for complete search history.

(56) References Cited

U.S. PATENT DOCUMENTS

| | | | |
|---|---|---|---|
| 2010/0169343 A1* | 7/2010 | Kenedy | G06F 16/9535 707/758 |
| 2016/0099963 A1* | 4/2016 | Mahaffey | H04L 63/0227 726/25 |
| 2017/0235848 A1* | 8/2017 | Van Dusen | G06F 16/904 705/12 |
| 2018/0027006 A1* | 1/2018 | Zimmermann | H04L 63/0245 726/11 |
| 2019/0295087 A1* | 9/2019 | Jia | H04L 67/22 |
| 2019/0295088 A1* | 9/2019 | Jia | G06Q 20/4016 |

OTHER PUBLICATIONS

Husseini et al. "A Novel Trust-Based Authentication Scheme for Low Resource Devices in Smart Environments", Abstract, The 2nd International Conference on Ambient Systems, Networks and Technologies (ANT), Procedia Computer Science vol. 5, 2011. (Year: 2011).*

* cited by examiner

*Primary Examiner* — Tongoc Tran
(74) *Attorney, Agent, or Firm* — Haynes and Boone LLP

(57) ABSTRACT

A risk analysis system configures the decision engine to detect anomalous online activities by analyzing usage patterns associated with one or more user accounts across multiple frequencies. The risk analysis system obtains transaction log data representing transactions associated with one or more accounts, and extracts data from the transaction log data to generate time-series data along a time dimension. The time-series data may represent usage characteristics of one or more user accounts over a period of time. The risk analysis system derives pattern data representing usage patterns across multiple different frequencies based on the time-series data. The risk analysis system then configures the decision engine to detect anomalous account activities based on the derived pattern data.

20 Claims, 8 Drawing Sheets

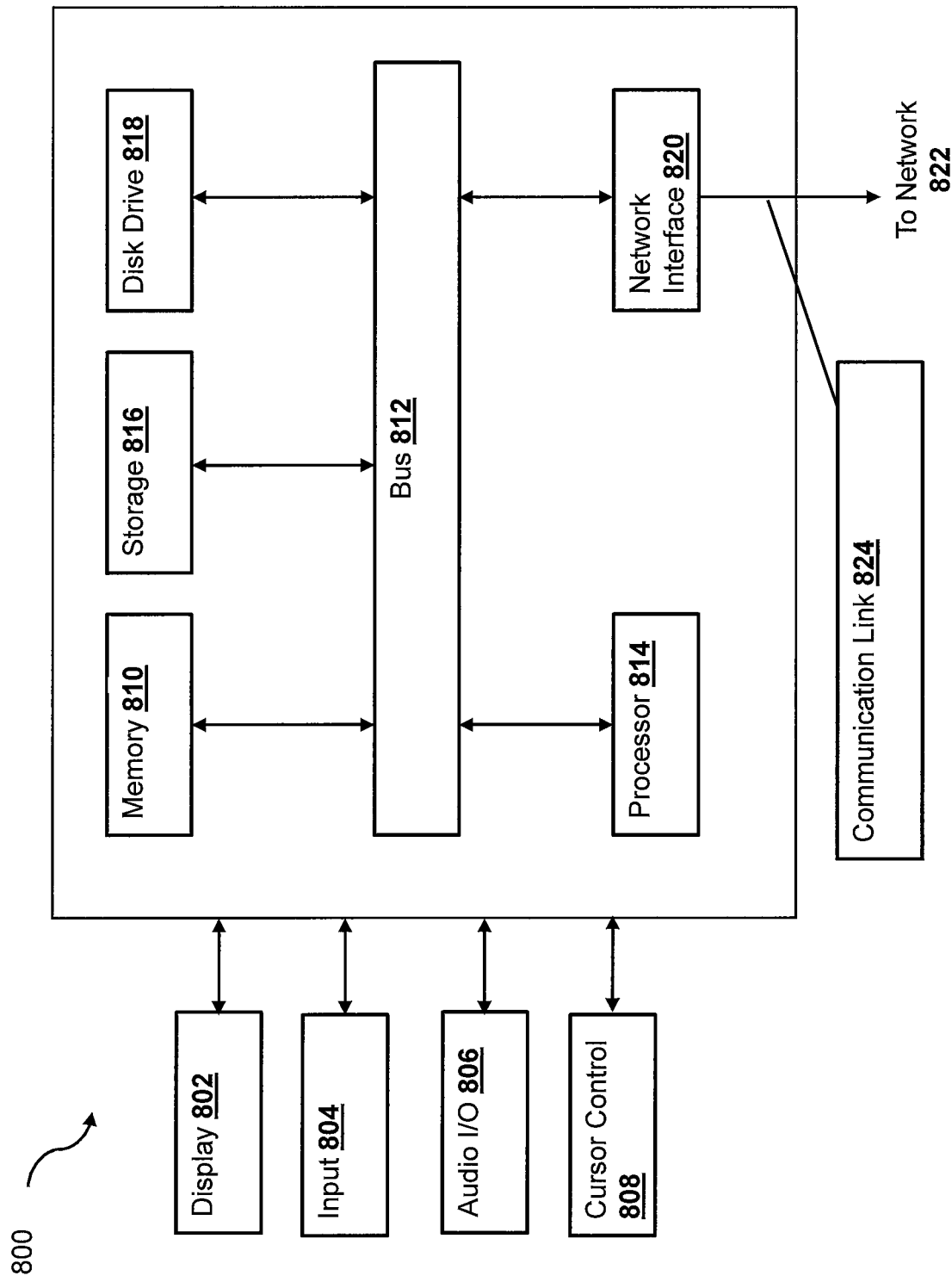

FRAUD DETECTION BASED ON ANALYSIS OF FREQUENCY-DOMAIN DATA

BACKGROUND

The present specification generally relates to fraud detection, and more specifically, to detecting fraudulent electronic transactions based on analysis of data in a frequency domain.

RELATED ART

Tactics in performing fraudulent transactions electronically are ever-evolving and becoming more sophisticated. Entities that provide services electronically need to keep pace with the fraudulent users in providing security measures, such as accurately detecting fraud transactions in real-time. In this regard, a decision engine and possibly one or more risk analysis models maybe utilized to assist in making a real-time determination of whether a transaction is a fraudulent transaction or not. The decision engine usually analyzes data related to the transaction, such as through a device used to initiate the transaction, a user account associated with the transaction, a transaction amount, a browser type used to initiate the transaction, etc. in order to determine whether the transaction is likely a fraudulent transaction. The decision engine may compare the data related to the transaction against data related to previous (e.g., historic) transactions to make such a determination.

However, these types of analyses are limited to detecting fraudulent transactions that, in one or more aspects, stand out from past transactions. As fraudulent tactics become more sophisticated, these types of analyses may not be as effective as expected. For example, spoofing techniques may be used to mask the actual IP address or browser type used to initiate the transaction. Furthermore, a large transaction amount may be broken into multiple smaller amounts to be associated with multiple transactions to deter detection. Thus, there is a need for a more sophisticated decision engine for detecting fraudulent transactions.

BRIEF DESCRIPTION OF THE FIGURES

FIG. 8 is a block diagram of a system for implementing a device according to an embodiment of the present disclosure.

Figure 1:
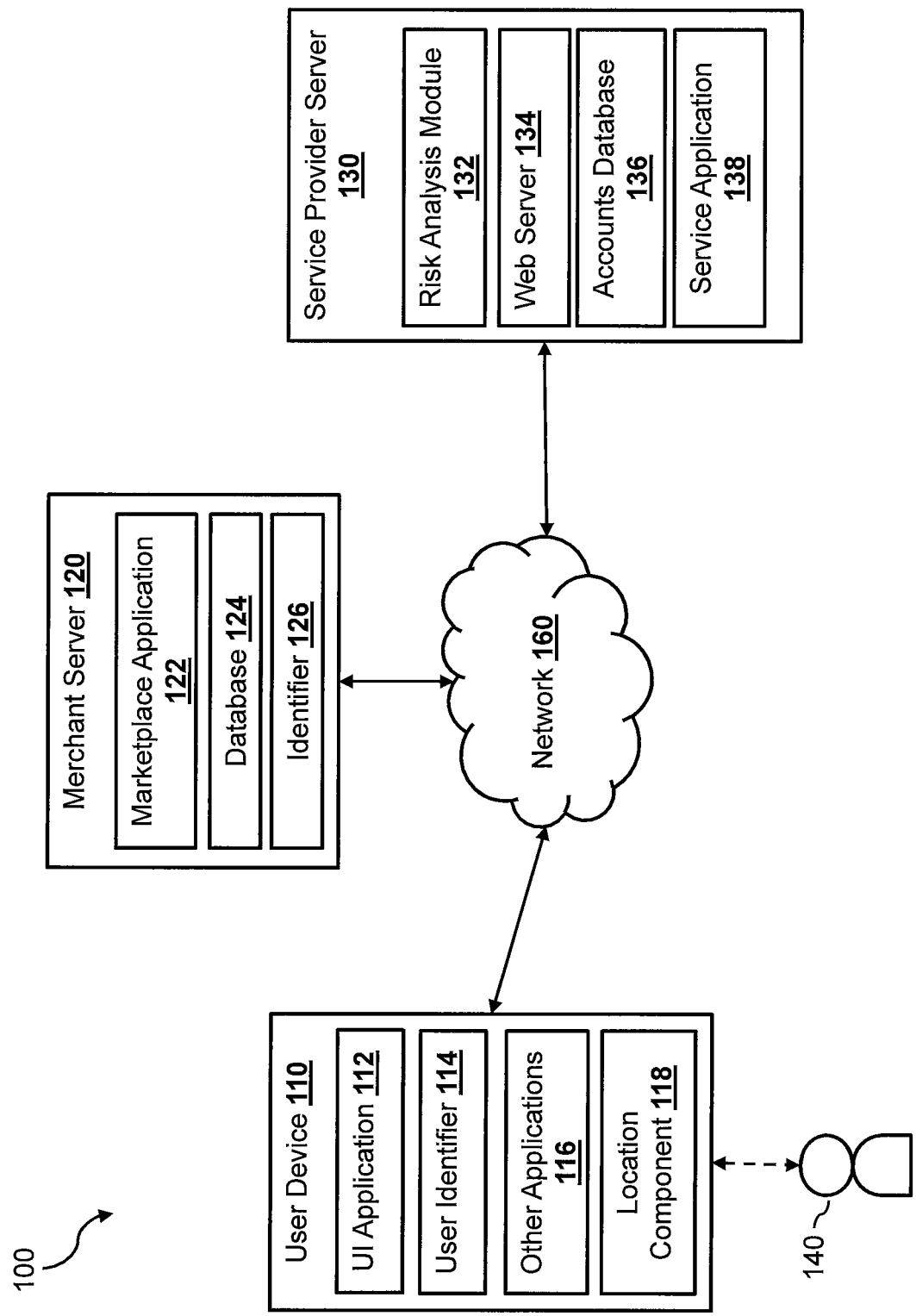
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for configuring a decision engine in detecting anomalous online activities. In particular, the decision engine is configured to detect anomalous online activities by analyzing patterns across multiple frequencies. As discussed above, conventional techniques that use data related to a single transaction may be insufficient or ineffective to detect sophisticated fraudulent transaction schemes. On the other hand, usage characteristics (e.g., usage patterns) of one or more user accounts over one or more periods of time may provide a better indicator for detecting anomalous (e.g., fraudulent) transactions. For example, it may be determined that on average, a particular user account has been used to perform approximately a first number of transactions every week for the past year. When it is detected that the particular user account has been used to perform a second number of transactions (e.g., the second number being substantially larger than the first number) in the past week, the system may determine that the particular user account may be involved in fraudulent activities. In another example, it may be determined that on average, an approximate first number of new user accounts have been created every month within a particular geographical region. When it is detected that a second number (e.g., the second number being substantially larger than the first number) of user accounts have been created in the past month, the system may determine that fraudulent activities may be involved in the particular geographical region.

However, different user accounts may exhibit different patterns. In particular, the patterns exhibited by the different user accounts may be associated with different frequencies, which poses challenges in determining the pattern(s) and the corresponding frequency (or frequencies) to establish a baseline behavior. As such, a risk analysis system according to various embodiments of the disclosure may configure a decision engine to generate an outcome that indicates a likelihood of fraudulent online activity based on analyzing usage patterns across multiple frequencies associated with one or more user accounts.

In some embodiments, the risk analysis system obtains transaction log data representing transactions associated with one or more accounts. In one example, the transaction log data may represent transactions associated with a single user account while in another example, the transaction log data may represent transactions associated with a group of user accounts having one or more common characteristics (e.g., from a particular geographical region, from a particular demographic, etc.). The transaction log data may be obtained in an unstructured format (e.g., a text format), and may include information related to usage and/or status of one or more user accounts. For example, the transaction log data may include information for multiple transactions that involve a user account. The information may include, for each transaction, an identifier identifying a user account associated with the transaction, a type of transaction (e.g., a login transaction, a payment transaction, a fund withdrawal transaction, an electronic messaging transaction, etc.), a date and time of the transaction, and an amount associated with the transaction. In another example, the transaction log data may also include a status of one or more user accounts, such as an account balance at different points in time (e.g., every day, every hour, every week, etc.).

In some embodiments, the risk analysis system may extract data from the transaction log data to generate time-series data along a time dimension. The time-series data may represent usage characteristics of one or more user accounts over a period of time. For example, the time-series data may represent a daily account balance of a user account over the past year. In another example, the time-series data may represent a number of times a user logs into a user account every day. In yet another example, the time-series data may represent the number of new user accounts created every day in a particular geographical region over the past two years.

As discussed above, because different time-series data (e.g., associated with different user accounts, different usages/transactions, etc.) may exhibit different patterns, it can be challenging to detect a pattern by analyzing the time-series data alone. For example, a user account may exhibit a pattern of being accessed (e.g., a user logging into the user account) thirty times a week, even though the number of times that the user account is accessed may vary greatly on a day-to-day basis (e.g., accessed 3 times on one day but accessed 0 times on the following day, etc.). In another example, a user account may exhibit a pattern of performing ten payment transactions every month, even though the number of payment transactions performed each day (or each week) may vary greatly.

As such, in some embodiments, the risk analysis system may derive pattern data representing usage patterns across multiple different frequencies based on the time-series data. Different embodiments may use different techniques to transform the time-series data into the pattern data. For example, the risk analysis system may perform one or more mathematical transformation (e.g., a Fast Fourier Transformation) on the time-series data to generate the pattern data. In some embodiments, the pattern data may include pattern strength values associated with different frequencies (e.g., daily, every two days, every three days, every week, every month, etc.). The pattern strength values may indicate how strong a pattern the time-series data exhibits over the corresponding frequencies. For example, a first pattern strength value associated with a first frequency being higher than a second pattern strength value associated with a second frequency indicates that the time-series data exhibits a stronger pattern across the first frequency than across the second frequency.

To further process the pattern strength values, the risk analysis system may divide the pattern strength values into multiple bins, where each bin represents a range of frequencies. For example, a first bin may represent the frequency range of every 16 days to every 13 days, a second bin may represent the frequency range of every 12 days to every 9 days, a third bin may represent the frequency range of every 8 days to every 5 days, and a fourth bin may represent the frequency range of every 4 days to every day. The pattern strength values in each bin may be used to compute one or more pattern indexes for the corresponding range of frequencies. For example, the pattern indexes may include at least one of a maximum pattern strength value, a minimum pattern strength value, a mean value, or a standard deviation value computed based on the pattern strength values in the bin.

In some embodiments, the risk analysis system may configure the decision engine to detect anomalous account activities based on the derived pattern indexes. The decision engine may include a machine learning model that may be implemented as an artificial neural network (e.g., a recursive neural network (RNN), a convolutional neural network (CNN), etc.). As such, the risk analysis system may configure the machine learning model to take at least one of the pattern index as input values for the neural network and output a likelihood of anomalous (e.g., fraudulent) activity involving one or more user accounts based on the at least one pattern index.

While analyzing data in a frequency domain has been done in other technical areas, such as in electronic signal analysis, it has never been used in modeling online user behavior, and specifically, in detecting fraudulent online activity. Unexpectedly, using only the pattern indexes (computed in a manner as disclosed herein) as the only input values enable the decision engine to detect fraudulent transactions with high accuracy, at least as accurate if not more than using conventional techniques.

FIG. 1 illustrates an electronic transaction system 100 that implements the risk analysis system as disclosed herein according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to log in to a user account to conduct account services and/or conduct electronic transactions (e.g., account transfers or payments) with the service provider server 130. Similarly, a merchant associated with the merchant server 120 may use the merchant server 120 to log in to a merchant account to conduct account services or conduct electronic transactions (e.g., payment transactions) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser), which may be utilized by the user 140 to conduct electronic transactions (e.g., account access, electronic payment transactions, etc.) with the service provider server 130 over the network 160. In one aspect, purchase expenses may be directly and/or automatically debited from an account related to the user via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. The user identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, fund transfer request, a request for adding an additional funding source (e.g., a new credit card), or other types of request. The user information may include user identification information.

The user device 110, in various embodiments, include a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100. Further, while specific components of user device 110 are described, other components may be included to provide data to a service provider for determining frequencies, IP addresses, locations, and other transaction data for fraudulent transaction analysis as described herein.

The merchant server 120, in various embodiments, may be maintained by a business entity (or in some cases, by a partner of a business entity that processes transactions on behalf of business entity). Examples of businesses entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100. As with the user device, while specific components of merchant server 120 are described, other components may be included to provide data to a service provider for determining frequencies, IP addresses, locations, transaction amounts, purchase details, and other transaction data for fraudulent transaction analysis as described herein.

The service provider server 130, in one embodiment, may be maintained by a transaction processing entity or an online service provider, which may provide processing for financial transactions and/or information transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc. of San Jose, Calif., USA, and/or one or more financial institutions or a respective intermediary that may provide multiple point of sale devices at various locations to facilitate transaction routings between merchants and, for example, financial institutions.

In some embodiments, the service application 138 may include a payment processing application (not shown) for processing purchases and/or payments for financial transactions between a user and a merchant. In one implementation, the payment processing application assists with resolving financial transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

In various embodiments, the service provider server includes a risk analysis module 132 that is configured to determine whether to authorize or deny an incoming request from the user device 110 or from the merchant server 120. In some embodiments, the risk analysis system disclosed herein may be implemented within the risk analysis module 132. The request may be a log-in request, a fund transfer request, a request for adding an additional funding source, a request to create a new user account, or other types of requests associated with the variety of services offered by the service provider server 130. As such, when a new request is received at the service provider server 130 (e.g., by the web server 134), the risk analysis module 132 may analyze the request and determine whether to authorize of deny the request. The risk analysis module 132 may transmit an indication of whether to authorize or deny the request to the web server 134 and/or the service application 138 such that the web server 134 and/or the service application 138 may process the request based on the indication.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, account balance history, account access history, Internet Protocol (IP) addresses, device information associated with the user account, which may be used by the risk analysis module 132 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Service provider server 130 may thus receive various transaction (including purchase, account creation, login request, and the like) data from user device 110 and/or merchant server 120 to perform risk/fraud analysis as described herein.

Figure 2:
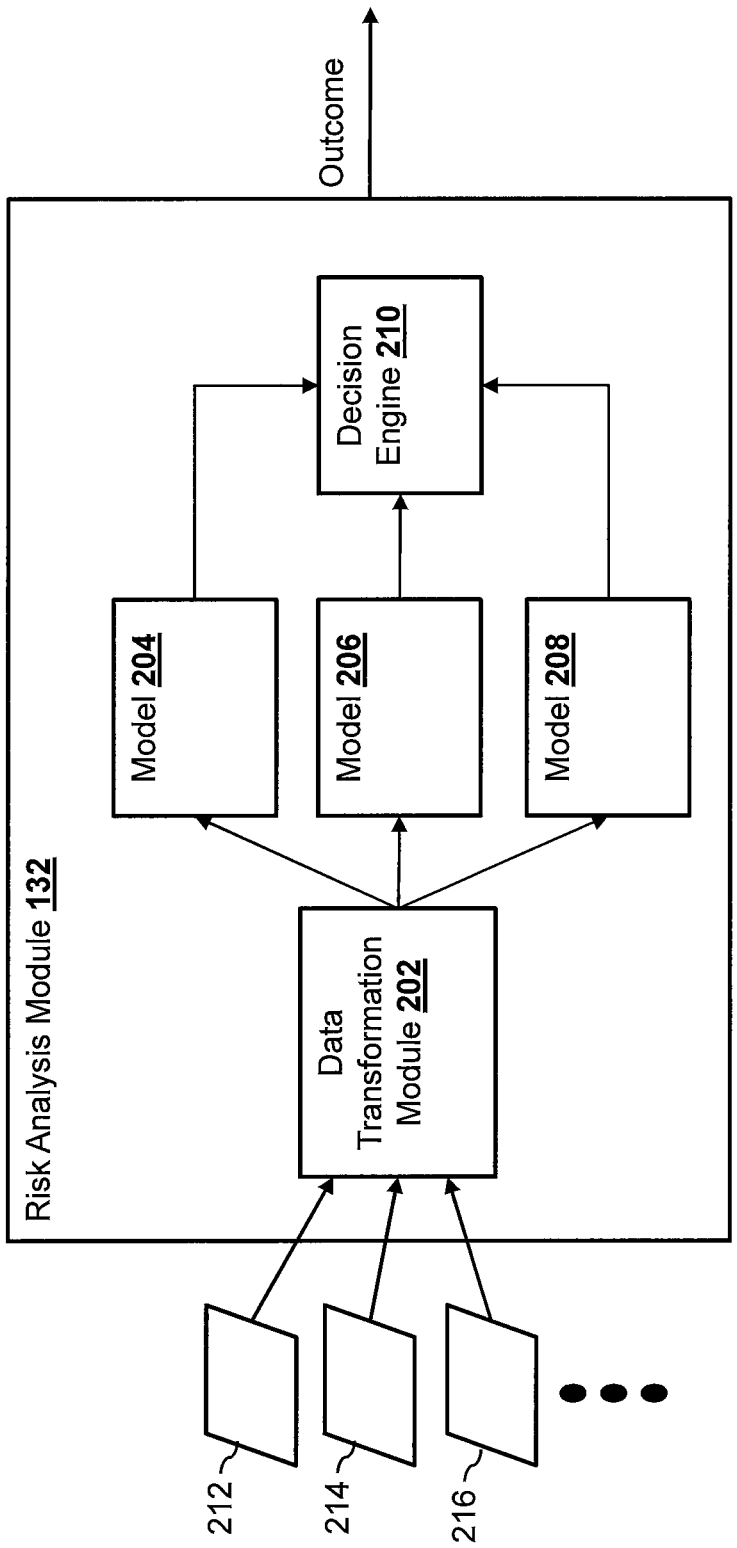
FIG. 2 is a block diagram illustrating a risk analysis module according to an embodiment of the present disclosure.

FIG. 2 illustrates a block diagram of the risk analysis module 132 according to an embodiment of the disclosure. In some embodiments, the risk analysis module 132 performs one or more analyses on data related to one or more user accounts to generate an outcome that indicates a likelihood of anomalous (e.g., fraudulent) activity related to the one or more user accounts. The outcome may be provided to other applications within the service provider server (e.g., the web server 134, the service application 138, etc.) such that the other applications may perform a corresponding action based on the outcome. In some embodiments, the outcome may be a binary outcome indicating whether the user account is likely involved in a fraudulent activity or not. In other embodiments, the outcome may be a value (e.g., a score) indicating a likelihood that the user account is involved in fraudulent activities.

The risk analysis module 132 includes a data transformation module 202, one or more computer-based models 204, 206, and 208, and a decision engine 210. Each of the computer-based models 204, 206, and 208 may be a machine learning model that is utilized by the decision engine 210 to generate an outcome. Further, each of the computer-based models 204, 206, and 208 may be configured by the risk analysis module 132 to receive one or more of the pattern indexes as described herein as inputs. The computer-based models 204, 206, and 208 may then produce corresponding values based on the pattern indexes that can be consumed by the decision engine 210 to produce the outcome. The data transformation module 202 may be configured to obtain transaction log data 212, 214, 216, etc. associated with one or more accounts and transform the transaction log data into the pattern indexes as discussed herein for ingestion by the computer-based models 204, 206, and 208, and the decision engine 210.

Figure 3:
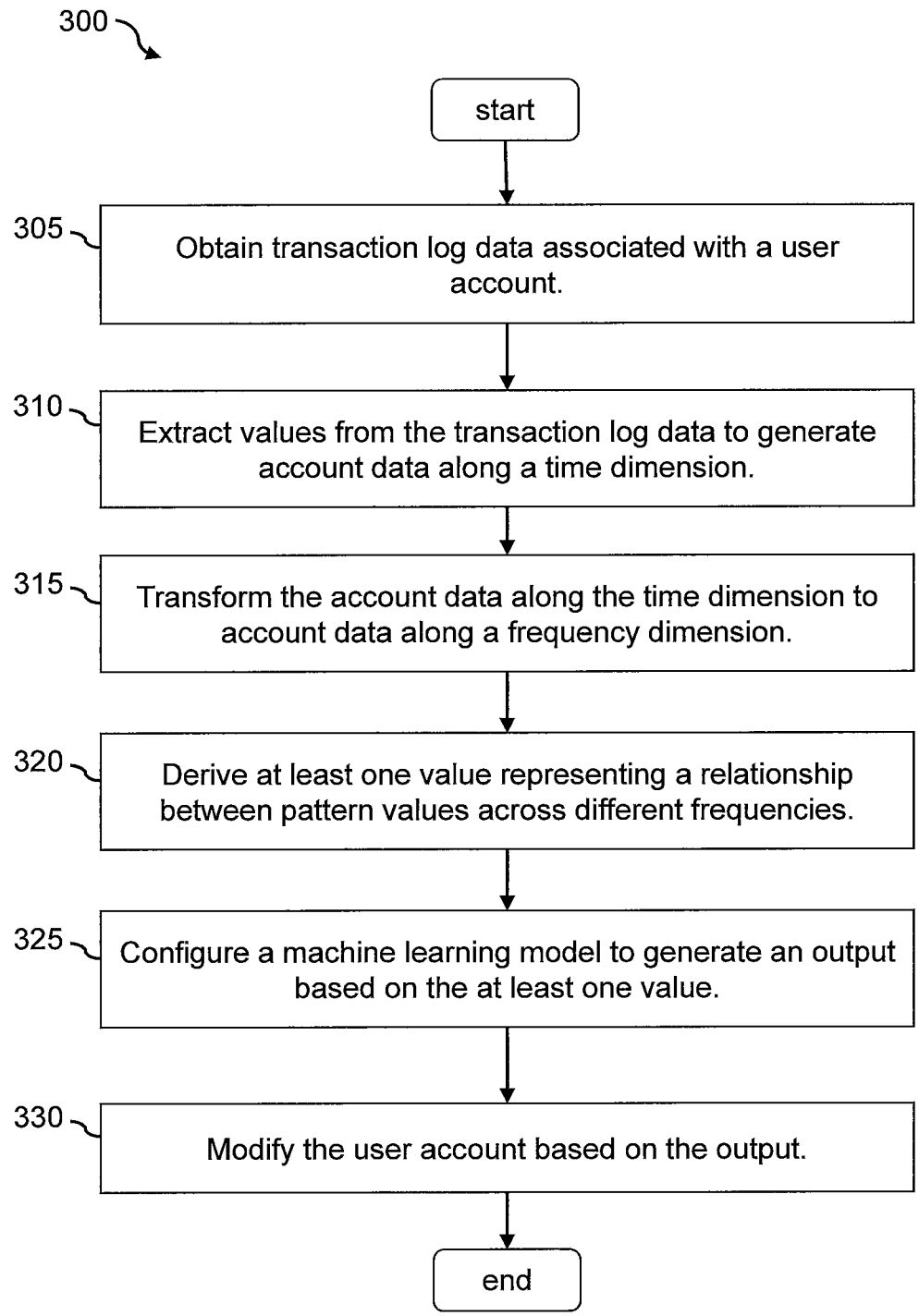
FIG. 3 is a flowchart showing a process of detecting anomalous activities associated with one or more user accounts according to an embodiment of the present disclosure.

FIG. 3 illustrates a process 300 for detecting anomalous activities associated with one or more user accounts according to an embodiment of the disclosure. In some embodiments, the process 300 may be performed by the risk analysis module 132. The process 300 begins by obtaining (at step 305) transaction log data associated with one or more user accounts. For example, the risk analysis module 132 may obtain transaction log data 212, 214, and 216 from other applications of the service provider server. In some embodiments, the web server 132 and/or the service application 138 logs transaction data periodically and/or whenever a user account is being accessed or utilized. For example, the web server 132 and/or the service application 138 may generate a record whenever a user logs into a user account, where the record may include information such as an identifier of the user account, a time/date of the log-in event, an Internet Protocol (IP) address of a device used to log into the user account, a geographical location of the device used to log into the user account, whether the log-in attempt succeeded or failed, and other information related to the log in event. The web server 132 and/or the service application 138 may generate another record when a user account is utilized to perform an electronic transaction (e.g., an electronic payment transaction), where the record may include information such as an identifier of the user account, a time/date of the electronic transaction event, a current account balance, a transaction amount, an Internet Protocol (IP) address of a device used to perform the electronic transaction, a geographical location of the device used to perform the electronic transaction, and other information related to the electronic transaction event.

As discussed above, since the web server 132 and/or the service application 138 may generate the transaction log data as they perform the transactions in real-time, the transaction log data may be generated in an unstructured format, such as a plain text format. As such, the process 300 may extract (at step 310) values from the transaction log data to generate account data along a time dimension (e.g., time-series data). For example, the data transformation module 202 may first determine a type of time-series data to generate (e.g., daily account balance for the past year, daily payment transaction amounts, daily log-in attempts, etc.). The data transformation module 202 may then extract values relevant to the type of time-series data from the transaction log data to generate the time-series data.

While the transaction log data is unstructured, the web server 132 and/or the service application 138 may follow a set of logging rules to log the data when processing/evaluating transaction events. In some embodiments, the web server 132 and/or the service application 138 may follow a specific order of data types in logging the data. For example, the web server 132 and/or the service application 138 may write into the data log information related to different transaction requests. For each transaction request, the web server 132 and/or the service application 138 may write the information related to the transaction event in the predetermined order of the data fields. In an example where the transaction event is a login event, the predetermined order of the log data may include one or more of: a transaction type of the request, an identity of a user account associated with the request, a time that the request was made, the IP address of a device that initiates the request, a number of successful logins in the past six months, a number of failed logins in the past six months, a browser type of a browser that initiated the request, or a device type of the device that initiates the request. The data may be written into the data log by the web server 132 and/or the service application 138 in such an order, where each variable separated may be by a predetermined character (e.g., a space character, etc.).

As such, in some embodiments, to generate a set of time-series data, the data transformation module 202 may use the set of logging rules to extract relevant information from the data log. For example, in order to generate data representing a daily balance, the data transformation module 202 may extract the current account balance value from each transaction record to generate the time-series data. It is noted that the web server 132 and/or the service application 138 may continue to receive/process transaction events, and continuously log the information related to the events to the data log. As such, the data transformation module 202 may periodically (e.g., every minute, every half a minute, every five minutes, etc.) retrieve new logged data, and insert the new activity data into the data structure in the same manner discussed above.

Figure 4:
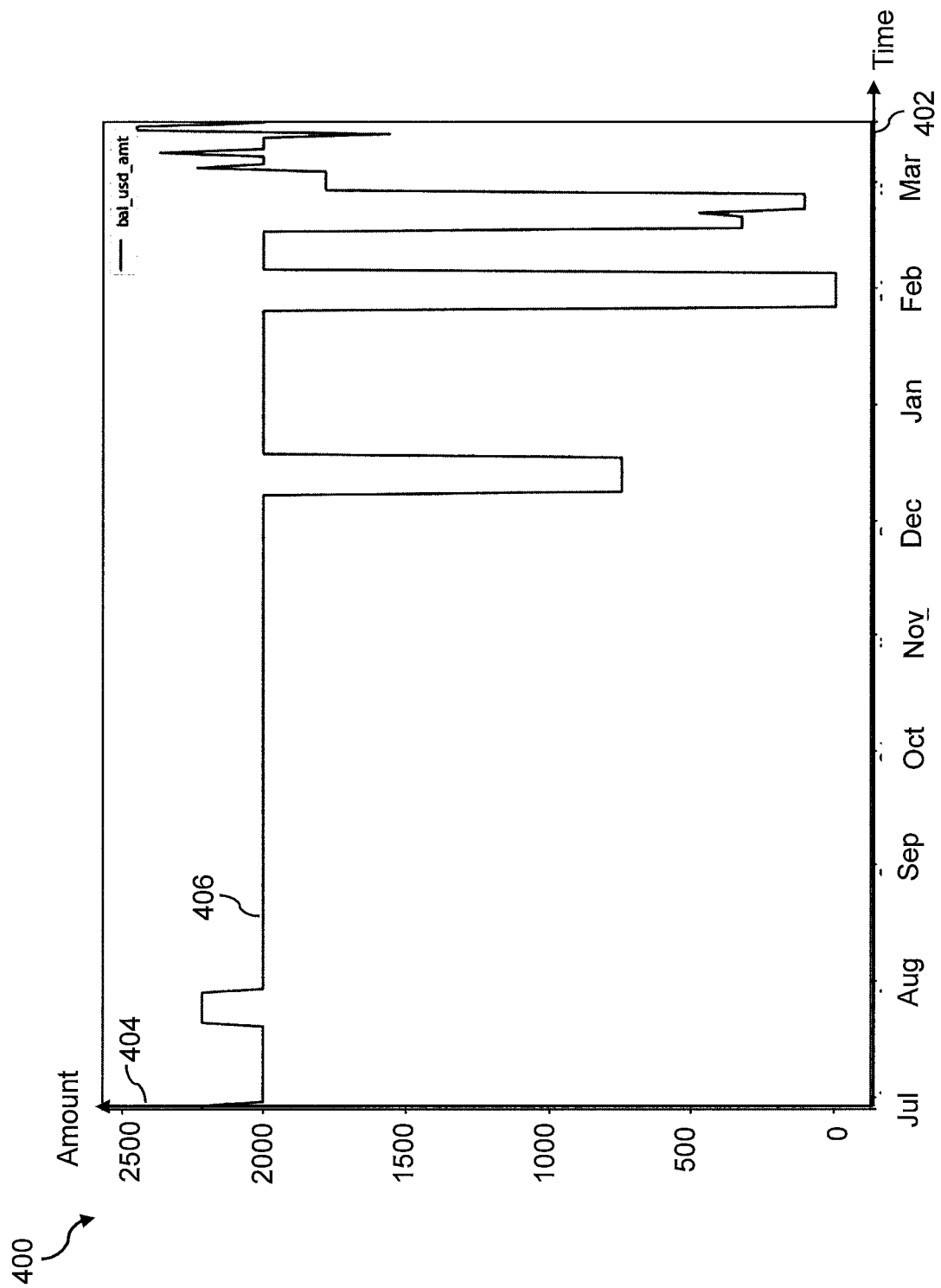
FIG. 4 illustrates exemplary account usage data along a time dimension according to an embodiment of the present disclosure.

FIG. 4 illustrates a graph 400 representing a set of example time-series data indicating a daily account balance of a user account over a period of time (e.g., 256 days) that is generated by the data transformation module 202. The graph 400 includes an x-axis 402 representing a time dimension and a y-axis representing monetary amounts. The line 406 in the graph 400 represents the various daily account balances in the time period between July through March. As shown in the graph 400, the daily balance begins with approximately $2,000 in July. The daily account balance increases by approximately $250 in August before going back down to the $2,000 level. The daily account balance of the user account remains steady at the $2,000 level until December, where the balance drops to $750. The balance also drops to $0 in February and in March before climbing back up to approximately $2,000.

While the time-series data can be somewhat informational, it can be challenging to derive any pattern based on the time-series data alone. As such, the process transforms (at step 315) the time-series data to pattern data along a frequency dimension. Different embodiments may use different techniques to transform the time-series data to the pattern data. In some embodiments, the data transformation module 202 may perform one more mathematical computations (e.g., a Fast Fourier Transformation, etc.) on the time-series data to generate the pattern data. In some embodiments, the generated pattern data includes values associated with multiple frequencies. Each of the values may indicate a likelihood (or a strength) that the time-series data exhibit a pattern over the corresponding frequency. As such, the values may be referred to as pattern strength values.

Figure 5:
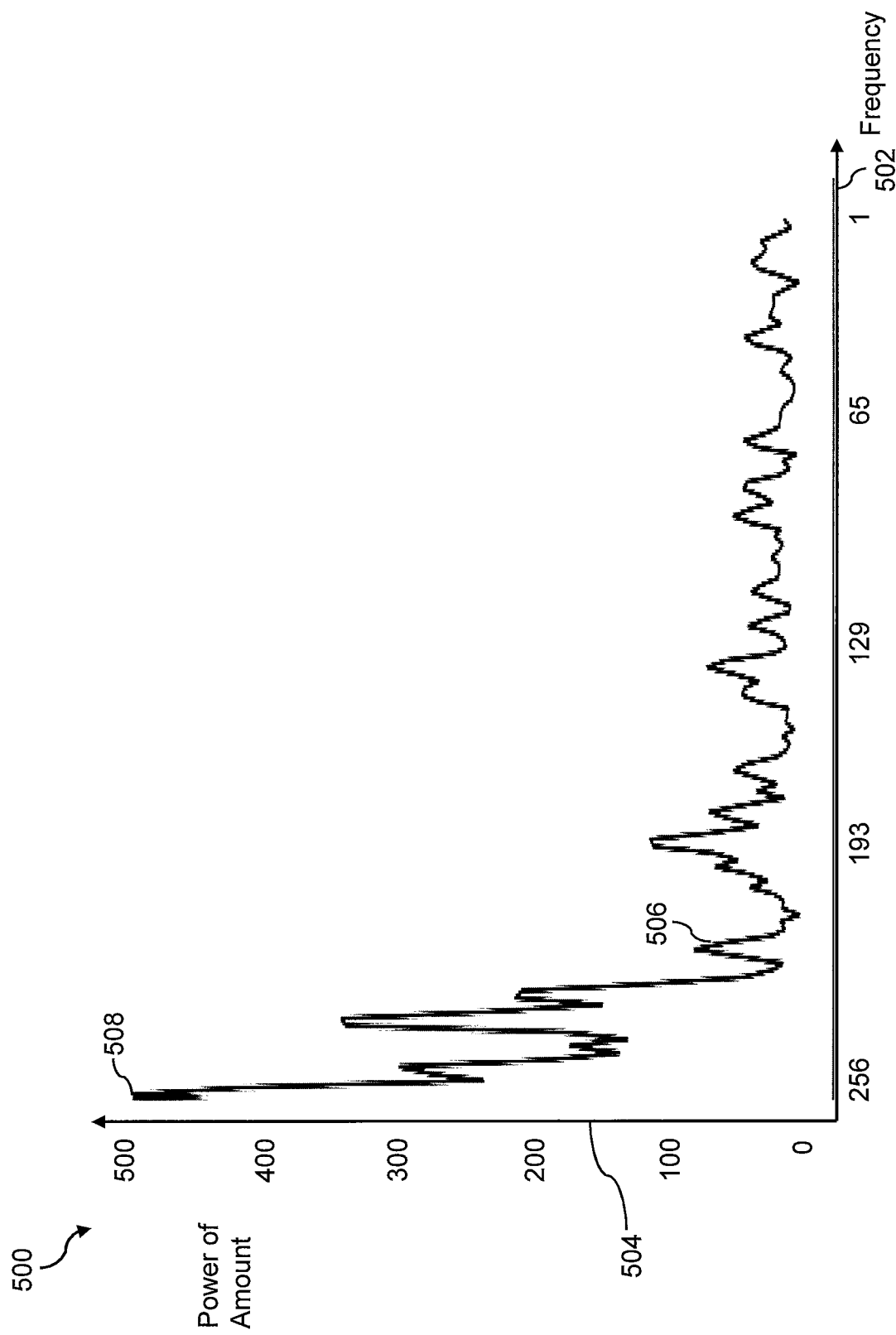
FIG. 5 illustrates exemplary pattern data along a frequency dimension according to an embodiment of the present disclosure.

FIG. 5 illustrates a graph 500 representing a set of pattern strength values generated based on the time-series data illustrated in the graph 400. The graph 500 includes an x-axis 502 representing a frequency dimension and a y-axis representing the pattern strengths. The line 506 in the graph 500 represents the various pattern strength values along the frequency dimension. The line 506 begins at a low frequency of approximately every 256 days (the entire time period recorded in the graph 400) and ends at a high frequency of every 1 day. As such, the line 506 represents the pattern strength values corresponding to different frequencies from every 256 days, every 255 days, every 254 days . . . every 3 days, every 2 days, and every 1 day. As shown in the graph 500, the pattern strength values peak (having the highest pattern value of 487) at the low frequency of every 256 day.

In this example, the pattern data includes 256 values, corresponding to 256 different frequencies. While the pattern data accurately represents the usage patterns of the user account during the period of time, the pattern data is too granular for modeling the usage pattern of the user account in general. As such, the process derives (at step 320) at least one value representing a relationship between pattern strength values across different frequencies for the user account. For example, the data transformation module 202 may further process the pattern data to derive one or more values (pattern indexes) representing the relationship between the pattern strength values across multiple frequencies based on the data in the graph 500.

Figure 6:
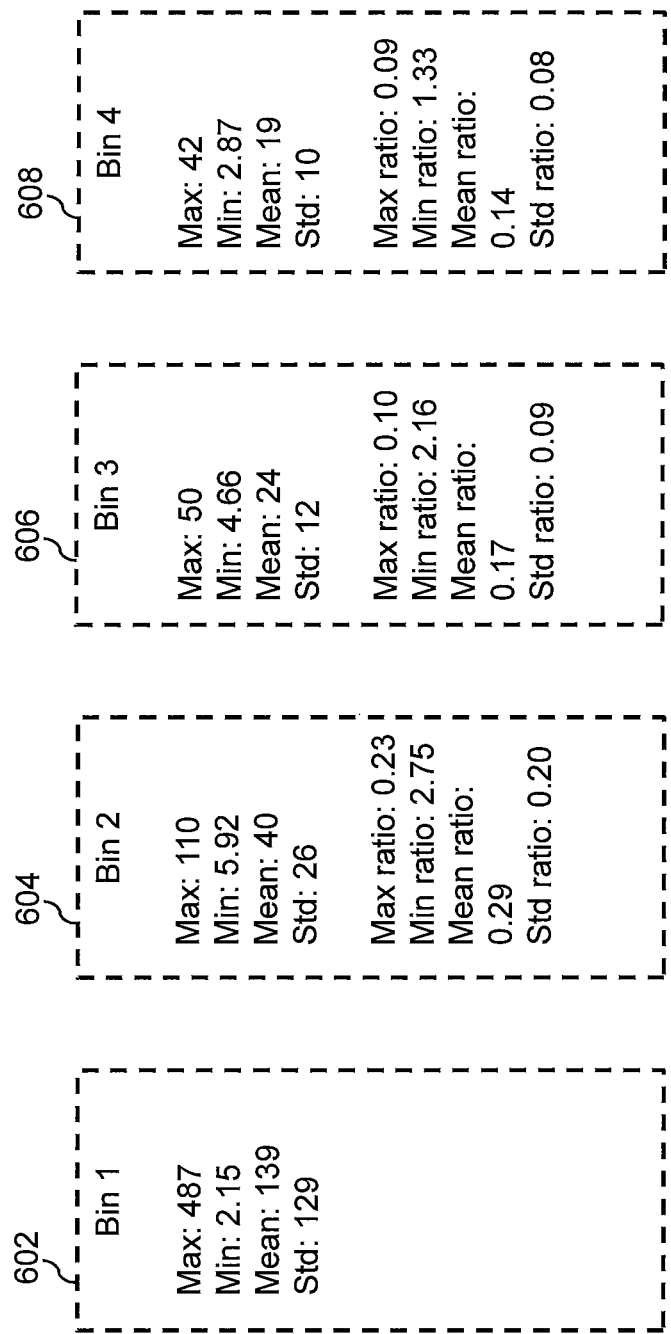
FIG. 6 illustrates pattern data being divided into multiple bins according to an embodiment of the present disclosure.

Different embodiments use different techniques to derive such a value. In some embodiments, the data transformation module 202 may divide the frequencies corresponding to the pattern data into multiple groups (e.g., bins), for example, by using one or more binning algorithms Each group corresponds to a range of frequencies. In some embodiments, the ranges of frequencies corresponding to the groups have substantially the same size (e.g., within 90%). For example, the data transformation module 202 may divide the pattern strength values in FIG. 5 into four groups (e.g., bins). FIG. 6 illustrates the four bins 602-608 generated by the data transformation module 202 according to one embodiment of the disclosure. In this example, each bin represents a frequency range of 128 days. The first bin 602 corresponds to the lowest frequency range (the frequencies between every 256 days and every 193 days), the second bin 604 corresponds to the frequencies between of every 192 days and every 129 days, the third bin 606 corresponds to the frequencies between every 128 days and every 65 days, and the fourth bin corresponds to the highest frequency range (the frequencies between every 64 days to every 1 day). While the pattern strength data is divided into four bins in this example, it has been contemplated that different number of bins (e.g., 6, 8, 10, etc.) may be generated by the data transformation module 202 without departing from the spirit of this disclosure.

In some embodiments, in order to derive the values representing the relationship between pattern data across different frequencies, the data transformation module 202 may compute, for each bin, a maximum pattern strength value, a minimum pattern strength value, a mean pattern strength value, and a standard deviation value. In this example, the data transformation module 202 has computed, for the bin 602, a maximum pattern strength value of 487, a minimum pattern strength value of 2.15, a mean pattern strength value of 139, and a standard deviation of 129. The data transformation module 202 has computed, for the bin 604, a maximum pattern strength value of 110, a minimum pattern strength value of 5.92, a mean pattern strength value of 40, and a standard deviation of 26. The data transformation module 202 has computed, for the bin 606, a maximum pattern strength value of 50, a minimum pattern strength value of 4.66, a mean pattern strength value of 24, and a standard deviation of 12. The data transformation module 202 has also computed, for the bin 608, a maximum pattern strength value of 42, a minimum pattern strength value of 2.87, a mean pattern strength value of 19, and a standard deviation of 10. These values may be referred to pattern indexes, representing relationships of the pattern data within each bin.

The process 300 then configures (at step 325) a machine learning model to generate an output based on the at least one value derived from the pattern data. For example, the risk analysis module 132 may configure the computer-based models 204, 206, and 208 to use the pattern indexes as input values to generate an output. As discussed before, the computer-based models 204-208 may include machine learning models implemented as one or more types of an artificial neural network.

Figure 7:
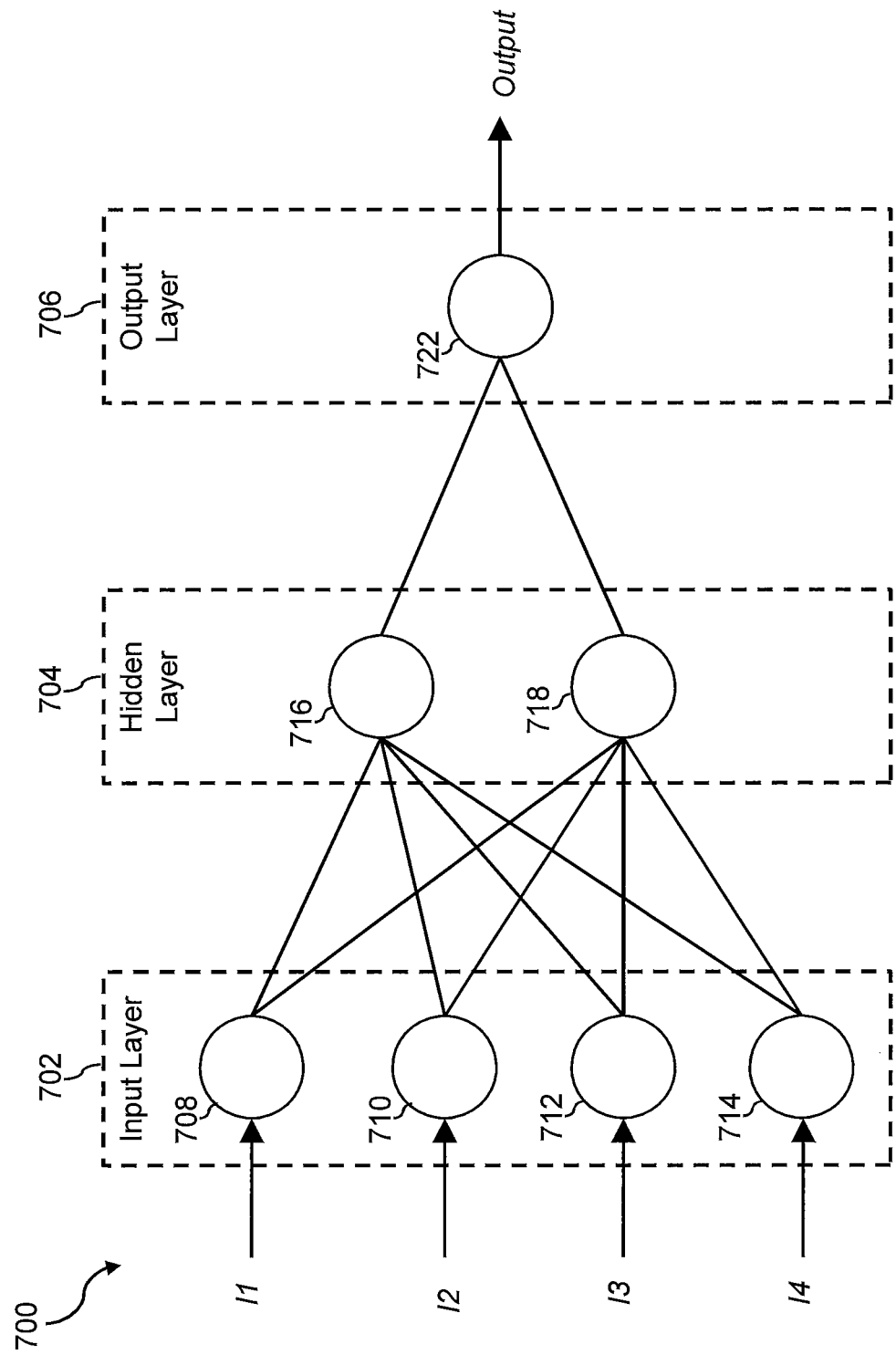
FIG. 7 illustrates an exemplary artificial neural network according to an embodiment of the present disclosure.

FIG. 7 illustrates an example artificial neural network 700 that implements the computer-based models 204, 206, and 208 for detecting anomalous activities associated with one or more user accounts. As shown, the artificial neural network 700 includes three layers—an input layer 702, a hidden layer 704, and an output layer 706. Each of the layers 702, 704, and 706 may include one or more nodes. For example, the input layer 702 includes nodes 708-714, the hidden layer 704 includes nodes 716-718, and the output layer 706 includes a node 722. In this example, each node in a layer is connected to every node in an adjacent layer. For example, the node 708 in the input layer 702 is connected to both of the nodes 716-718 in the hidden layer 704. Similarly, the node 716 in the hidden layer is connected to all of the nodes 708-714 in the input layer 702 and the node 722 in the output layer 706. Although only one hidden layer is shown for the artificial neural network 800, it has been contemplated that the artificial neural network 700 used by the risk analysis module 132 may include as many hidden layers as necessary.

In this example, the artificial neural network 700 receives a set of input values and produces an output value. Each node in the input layer 702 may correspond to a distinct input value. As such, the risk analysis module 132 may configure nodes 708-714 in the input layer 702 of the artificial neural network 700 to correspond to one or more of the pattern indexes generated by the data transformation module 202. For example, the node 708 may correspond to a mean value of the bin 602, the node 710 may correspond to a standard deviation in the bin 604, the node 712 may correspond to the minimum value of the bin 606, and the node 714 may correspond to the maximum value of the bin 608. Although only four input nodes are included in the artificial neural network 700, more input nodes may be included in other artificial neural networks that implement the computer-based models 204-208. For example, the risk analysis module 132 may configure the artificial neural network 700 to include sixteen input nodes to represent the maximum values, the mean values, the minimum values, and the standard deviations of the bins 602-608. In other words, the maximum values, the mean values, the minimum values, and the standard deviations of the bins 602-608 may be inputted to the corresponding input nodes in the artificial neural network 700 as input values.

In some embodiments, each of the nodes 716-718 in the hidden layer 704 generates a representation, which may include a mathematical computation (or algorithm) that produces a value based on the input values received from the nodes 708-714. The mathematical computation may include assigning different weights to each of the data values received from the nodes 708-714. The nodes 716 and 718 may include different algorithms and/or different weights assigned to the data variables from the nodes 708-714 such that the nodes 716-718 may produce different values based on the same input values received from the nodes 708-714. In some embodiments, the weights that are initially assigned to the pattern indexes (or input values) for each of the nodes 716-718 may be randomly generated (e.g., using a computer randomizer). The values generated by the nodes 716 and 718 may be used by the nodes 722 in the output layer 706 to produce an output value for the artificial neural network 700. In some embodiments, the output value produced by the artificial neural network 800 may indicate whether a likelihood that the user account is involved with one or more types of fraudulent activity.

The artificial neural network 700 may be trained by using historical data (training data). The historical data may include pattern indexes associated with the user account generated based on transaction log data for different time periods in the past (e.g., July 2016 through March 2017, July 2015 through March 2016, July 2014 through March 2015, etc.). By providing the training data to the artificial neural network 700, the nodes 716-718 in the hidden layer 704 may be trained (adjusted) such that an optimal output (a likelihood of the user account involved in a type of fraudulent activity) is produced in the output layer 706 based on the training data.

By continuously providing different sets of training data, and penalizing the artificial neural network 700 when output is incorrect, the artificial neural network 700 (and specifically, the representations of the nodes in the hidden layer 704) may be trained (adjusted) to improve its performance in detecting fraudulent activities for the user account over time. Adjusting the artificial neural network 700 may include adjusting the weights associated with each node in the hidden layer 704.

In some embodiments, in order to increase the amount of training data available to train the computer-based models 204-208, pattern indexes generated based on transaction log data associated with different user accounts may be used to train the models 204-208. For example, user accounts having common characteristics (e.g., gender, age group, locations, etc.) as the user account may be used for providing the training data. However, even though the user accounts may have one or more common characteristics, they are still associated with different users, and may exhibit different behaviors (resulting in different account usage patterns). As such, in order to normalize the pattern data, the data transformation module 202 may generate additional pattern indexes that represent the relationship of pattern strength values between different bins. As discussed above, the pattern indexes generated may include the maximum value, the minimum value, the mean value, and the standard deviation. However, these values are computed based on the pattern strength values in each bin, thus representing the pattern characteristics within each bin. The additional pattern indexes on the other hand focuses on the relationship of the pattern strength values between different bins.

For example, the data transformation module 202 may use the pattern indexes computed for bin 602 (the bin that represents the lowest frequency range) as a baseline, and may compute different ratios between the pattern indexes of other bins and the pattern indexes of the bin 602. In this example, the transformation module 202 may compute, for the bin 604, a maximum ratio of 0.23 (110/487), a minimum ratio of 2.75 (5.92/2.15), a mean ratio of 0.29 (40/139), and a standard deviation ratio of 0.20 (26/129). The transformation module 202 may compute, for the bin 606, a maximum ratio of 0.10 (50/487), a minimum ratio of 2.16 (4.66/2.15), a mean ratio of 0.17 (24/139), and a standard deviation ratio of 0.09 (12/129). The transformation module 202 may also compute, for the bin 608, a maximum ratio of 0.09 (42/487), a minimum ratio of 1.33 (4.66/2.15), a mean ratio of 0.14 (19/139), and a standard deviation ratio of 0.08 (10/129).

In some embodiments, the risk analysis module 132 may configure the models 204-208 to use the new pattern indexes (the ratios) instead of, or in addition to, the other pattern indexes as input values for producing the outputs for the decision engine 210. In some embodiments, the decision engine 210 may consume the outputs generated by the models 204-208 to produce the outcome that can be used by the web server 134 and/or the service application 138.

Referring back to FIG. 3, the process 300 then modifies (at step 330) the user account based on the output. For example, the risk analysis module 202 (or the web server 134 and/or the service application 138) may perform an action associated with the user account based on the outcome generated by the decision engine 210. In some embodiments, when the outcome generated by the decision engine 210 indicated that the user account is involved with a fraudulent activity, the service provider server 130 may adjust a security level of the user account. For example, the service provider server 130 may lock the user account from future accesses for a period of time. In another example, the service provider server 130 may require additional authentication (in addition to the regular authentication) in order to access the user account (e.g., requiring biometric data in addition to a password, requiring correct answers to one or more security questions in addition to a password, etc.).

When the process 300 is performed in response to a transaction request (e.g., a login request, an electronic payment transaction request, etc.) associated with the user account, the service provider server 130 may authorize such a request based on a positive outcome (indicating that the user account is not involved in a fraudulent activity) generated by the decision engine 210, or alternatively deny such a request based on a negative outcome (indicating that the user account is involved in a fraudulent activity) generated by the decision engine 210.

FIG. 8 is a block diagram of a computer system 800 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the risk analysis model generation functionalities described herein according to the process 300.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system for detecting anomalous online activity, the system comprising:
   a non-transitory memory; and
   one or more hardware processors coupled with the non-transitory memory and configured to read instructions from the non-transitory memory to cause the system to perform operations comprising:
      obtaining first data representing usage characteristics of at least one user account along a time dimension;
      determining, based on the first data, a plurality of pattern strength values corresponding to a plurality of frequencies across a range of frequencies, wherein each pattern strength value in the plurality of pattern strength values indicates a likelihood that a recurring pattern exists in the usage characteristics of the at least one user account over a corresponding frequency;
      deriving, based on the plurality of pattern strength values, a pattern index representing relationships between pattern strength values corresponding to adjacent frequencies in the plurality of frequencies; and
      generating, based on the pattern index, an output indicating a likelihood of fraudulent online activity associated with the at least one user account.

2. The system of claim 1, wherein the operations further comprise:
   accessing an unstructured transaction log associated with the at least one user account;
   extracting values from the unstructured transaction log; and
   generating the first data based on the extracting.

3. The system of claim 1, wherein the deriving the pattern index comprises:

dividing the plurality of pattern strength values into a plurality of groups, wherein each group represents a range of frequencies; and
analyzing corresponding portions of the plurality of pattern strength values in each of the plurality of groups to derive the pattern index.

4. The system of claim 3, wherein the pattern index is a first pattern index representing a first relationship between pattern strength values within a first group in the plurality of groups, wherein the first group of pattern strength values corresponds to a first range of frequencies, and wherein the operations further comprise:
deriving, based on the plurality of pattern strength values, a second pattern index representing a second relationship among pattern strength values within a second group in the plurality of groups, wherein the second group of pattern strength values corresponds to a second range of frequencies, and wherein the output is generated further based on the second pattern index.

5. The system of claim 4, wherein the output is generated further based on a ratio between the first pattern index and the second pattern index.

6. The system of claim 3, wherein the plurality of pattern strengths is divided into the plurality of groups using a binning algorithm.

7. The system of claim 1, wherein the pattern index is a first pattern index representing a first relationship among pattern strength values within a first group in the plurality of groups, wherein the first group of pattern strength values corresponds to a first range of frequencies in the plurality of frequencies, and wherein the operations further comprise:
generating a difference between the first pattern index and a second pattern index representing a second relationship among pattern strength values within a second group in the plurality of groups, wherein the second group of pattern strength values corresponds to a second range of frequencies, and wherein the output is generated further based on the difference.

8. The system of claim 1, wherein the operations further comprise using a machine learning model to generate the output based on the pattern index.

9. A method of detecting anomalous online activity, the method comprising:
obtaining first data representing usage characteristics of at least one user account along a time dimension;
determining, based on the first data, a plurality of pattern values corresponding to different frequencies over a range of frequencies, wherein each pattern value in the plurality of pattern values indicates a likelihood that a pattern exists in the usage characteristics of the at least one user account over a corresponding frequency;
deriving, based on the plurality of pattern values, a pattern index representing a relationship between pattern values across adjacent frequencies within the range of frequencies; and
generating, based on the pattern index, an output indicating a likelihood of fraudulent online activity associated with the at least one user account.

10. The method of claim 9, wherein the first data comprises data representing daily account balances of the at least one user account over a period of time.

11. The method of claim 9, wherein the first data comprises data representing daily transaction amounts associated with the at least one account over a period of time.

12. The method of claim 9, wherein the first data comprises data representing a number of login attempts associated with the at least one account over a period of time.

13. The method of claim 9, further comprising transforming the first data using a Fast Fourier Transformation algorithm.

14. The method of claim 9, further comprising performing an action based on the at least one user account and the output.

15. The method of claim 14, wherein the action comprises denying a request associated with the at least one user account.

16. The method of claim 14, wherein the at least one user account is associated with a first authentication mechanism for authenticating a user to access the at least one user account, wherein the action comprises providing a second authentication mechanism for authenticating the user to access the at least one user account based on the output.

17. A non-transitory machine-readable medium having stored thereon machine-readable instructions executable to cause a machine to perform operations comprising:
obtaining first data representing usage characteristics of at least one user account along a time dimension;
determining, based on the first data, a plurality of pattern values corresponding to a plurality of frequencies across a range of frequencies, wherein each pattern value in the plurality of pattern values indicates a likelihood that a pattern exists in the usage characteristics over a corresponding frequency;
deriving, based on the plurality of pattern values, a pattern index representing a relationship between pattern values across adjacent frequencies; and
generating, based on the pattern, an output indicating a likelihood of fraudulent online activity associated with the at least one user account.

18. The non-transitory machine-readable medium of claim 17, wherein the operations further comprise:
accessing an unstructured transaction log associated with the at least one user account;
extracting values from the unstructured transaction log; and
generating the first data based on the extracting.

19. The non-transitory machine-readable medium of claim 17, wherein the deriving the pattern index comprises:
dividing the plurality of pattern values into a plurality of groups, wherein each group represents a range of frequencies; and
analyzing corresponding portions of the plurality of pattern values in each of the plurality of groups to derive the pattern index.

20. The non-transitory machine-readable medium of claim 19, wherein the pattern index is a first pattern index representing a first relationship among pattern values within a first group in the plurality of groups, wherein the first group of pattern values corresponds to a first range of frequencies, and wherein the operations further comprise:
deriving, based on the plurality of pattern values, a second pattern index representing a second relationship among pattern values within a second group in the plurality of groups, wherein the second group of pattern values corresponds to a second range of frequencies, and wherein the output is generated further based on the second pattern index.

* * * * *